United States Patent [19]
Wildhaber

[11] 3,812,759
[45] May 28, 1974

[54] CUTTING TEETH ON WORKPIECES
[75] Inventor: Ernest Wildhaber, Rochester, N.Y.
[73] Assignee: Bird Island, Inc., Boston, Mass.
[22] Filed: Mar. 22, 1973
[21] Appl. No.: 343,969

[52] U.S. Cl............................ 90/3, 90/9.6, 90/11.48
[51] Int. Cl............................................. B23f 1/06
[58] Field of Search ................. 90/3, 7.5, 9.6, 11.48

[56] References Cited
UNITED STATES PATENTS
1,097,222   5/1914   Grannis...................................... 90/3

*Primary Examiner*—Francis S. Husar

[57] ABSTRACT

Apparatus for cutting teeth on a workpiece, comprising a workpiece support rotatable about a work axis; a pair of cutters respectively rotatable about cutter axes; each cutter having cutting edges arranged to make successive finish cuts each extending across the entire working depth of a tooth; the edges of each cutter having identical radial and axial positions relative to their respective cutter axes; the cutter axes defining a plane transverse to the work axes; the cutter axes lying on opposite sides of the work axes and defining therebetween an acute angle; one cutter having its cutting edges offset forward, with respect to its cutter axis, of a plane transverse to that cutter axis and including the work axis; the other cutter having its cutting edges offset rearward; with respect to its cutter axis, of a plane transverse to that cutter axis and including the work axis; the cutters being arranged to respectively cut the opposite surfaces of each tooth, with the cutting edges cutting clearance for each other; and a drive train for rotating the cutters and the work piece in timed relation to each other and effecting relative feed motion between the cutters and the workpiece axially of said workpiece.

12 Claims, 10 Drawing Figures

PATENTED MAY 28 1974 3,812,759

CUTTING TEETH ON WORKPIECES

BACKGROUND OF THE INVENTION

This invention relates to the production of helical or straight teeth with rotating cutters operating on a rotating cylindrical workpiece while a feed motion axially of the workpiece is provided.

A machine of the general sort involved is described in U.S. Pat. No. 3,662,650.

In general, these machines have cutting edges each adapted to cut the entire working depth of a tooth surface, from tip to fillet, and each located identically, radially and axially, with respect to the cutter axis. For rapid production, the cutting teeth are amply inclined to the peripheral direction of the cutters.

SUMMARY OF THE INVENTION

The invention provides for rapid, accurate production, with improved cutting action (e.g., with excellent balance of forces on the workpiece), and provides all necessary cutter clearances, all with simple, reliable apparatus (e.g., with a minimum of gear meshes in the fast-running timing train) that is easily accommodated to workpiece diameter, tooth thickness, and helix angle.

In general the invention features apparatus for cutting teeth on a workpiece, comprising a workpiece support rotatable about a work axis; a pair of cutters respectively rotatable about cutter axes; each cutter having cutting edges arranged to make successive finish cuts each extending across the entire working depth of a tooth; the edges of each cutter having identical radial and axial positions relative to their respective cutter axes; the cutter axes defining a plane transverse to the work axes; the cutter axes lying on opposite sides of the work axes and defining therebetween an acute angle; one cutter having its cutting edges offset forward, with respect to its cutter axis, of a plane transverse to that cutter axis and including the work axis; the other cutter having its cutting edges offset rearward, with respect to its cutter axis, of a plane transverse to that cutter axis and including the work axis; the cutters being arranged to respectively cut the opposite surfaces of each tooth, with the cutting edges cutting clearance for each other; and a drive train for rotating the cutters and the work piece in timed relation to each other and effecting relative feed motion between the cutters and the workpiece axially of said workpiece. In various preferred embodiments each cutter has cutting teeth the outside ends of which extend along a cylindrical surface, each cutting tooth has a cutting face inclined to the peripheral cutter direction and defining a cutting edge, and means are provided for changing the axial position of a cutter after resharpening its cutting edges; each cutter is mounted to permit its angular adjustment in the plane of the cutter axes, to permit change of the acute angle in accordance with workpiece diameter; the plane of the cutter axes is perpendicular to the work axis and the cutting edges are curved; means are provided for reversing the direction of the relative feed, and for changing the relative phasing of the cutters to remove additional stock from the tooth surfaces during the reverse feed; the cutters are adopted to cut the lobes of a rotor, the cutting edges each including a first portion for cutting the sides of the lobes and a second portion for cutting the tooth-space bottoms between the lobes, and means are provided for causing the cutters to approach the workpiece prior to reversal of the direction of the feed; the drive means comprises a worm having an axis parallel to the work axis, a pair of equal wormgears respectively rigid with the cutters and in mesh with the worm, gears for timing the rotation of the workpiece to the rotation of the worm, and means for producing relative motion, axially of the workpiece, between the workpiece and the worm on one hand and the cutters on the other hand; means are provided for producing relative motion axially of the workpiece between the worm and the workpiece; the workpiece support includes drive portions respectively above and below the workpiece; and the drive means includes an axially floating shaft parallel to the work axis for transmitting equal torque to the spindle portions.

Other advantages and features of the invention will be apparent from the description and drawings herein of a preferred embodiment thereof.

DESCRIPTION OF THE PREFERRED EMBODIMENT

Figure 1:
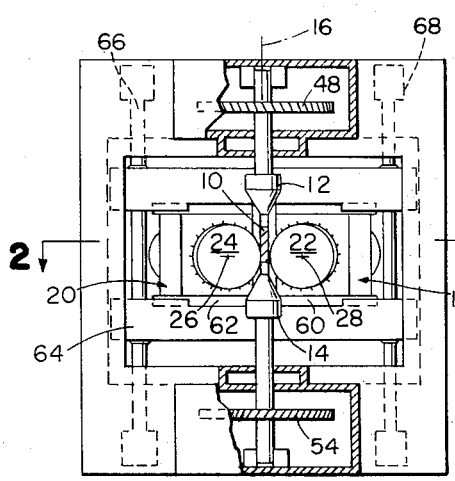
FIG. 1 is an end view, partially in section, of apparatus embodying the invention.
Figure 2:
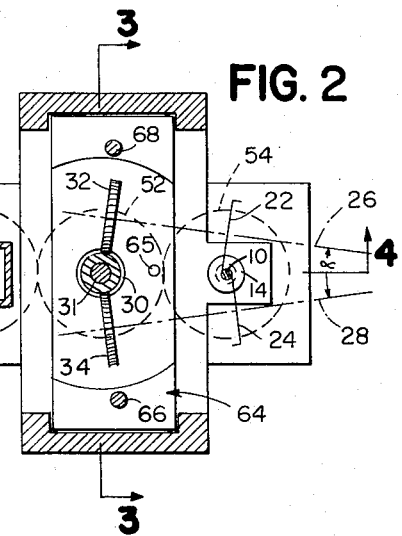
FIG. 2 is a sectional view taken along 2—2 of FIG. 1.
Figure 3:
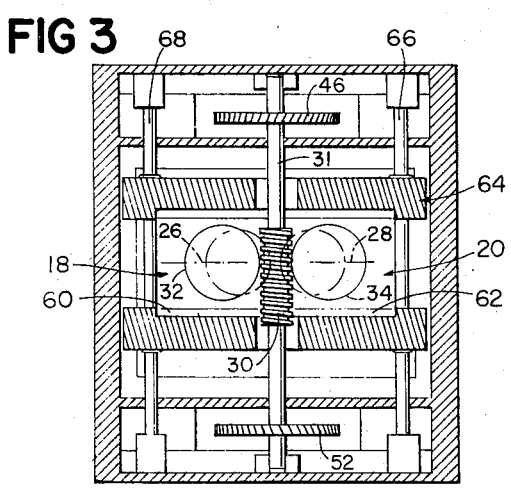
FIG. 3 is a sectional view taken along 3—3 of FIG. 2.
Figure 4:
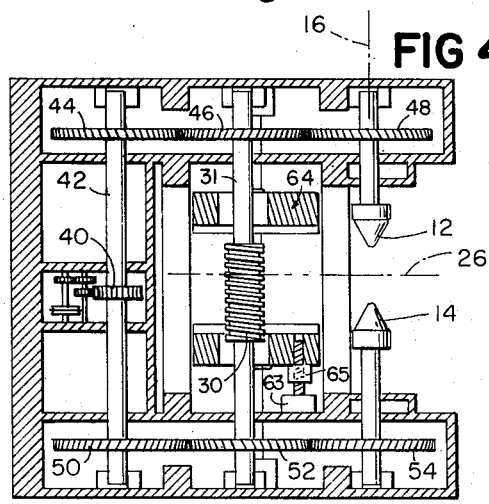
FIG. 4 is a sectional view taken along 4—4 of FIG. 2.
Figure 5:
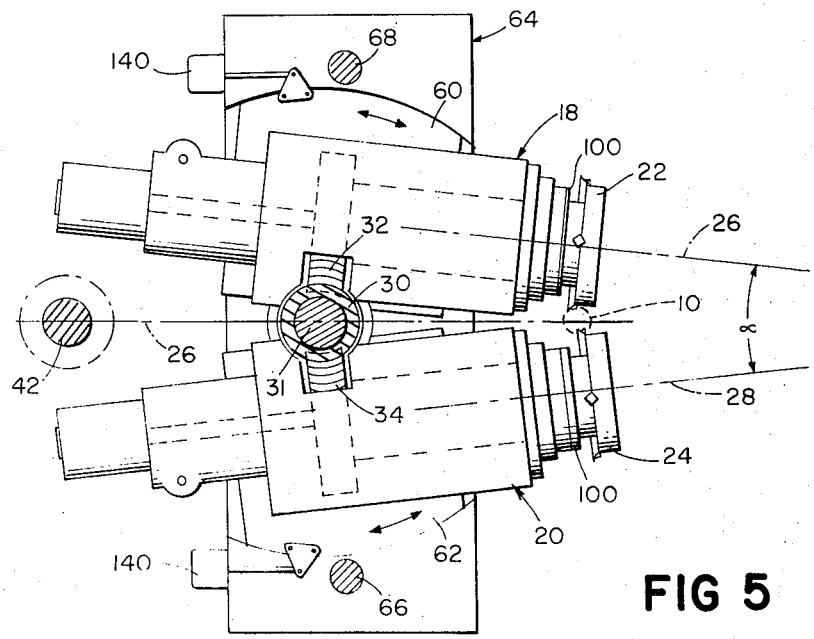
FIG. 5 is a plan view of the apparatus of FIGS. 1-4.

Referring to FIGS. 1-7, workpiece 10 is mounted between upper and lower supports 12 and 14 for rotation about work axis 16. Cutter spindles 18 and 20 respectively carry cutters 22 and 24 for rotation about cutter axes 26 and 28. Axes 26 and 28 are on opposite sides of the work axis, define a plane perpendicular to the work axis, and form an acute angle with each other, thus improving the balance of cutter forces on the workpiece.

Worm 30 on shaft 31 has its axis parallel to axis 16 and meshes with identical wormgears 32, 34 that respectively drive the cutter spindles.

Motive power is applied initially to gear 40 on shaft 42 parallel to axis 16, and is transmitted from the top and bottom of shaft 42 through helical gears 44-46-48 and 50-52-54 to worm 30 and workpiece supports 12 and 14. Gears 44 and 50 are of opposite hand and rigid with shaft 42. Gears 46 and 52 are similarly rigid with the worm shaft, and gears 48 and 54 with supports 12 and 14, respectively. Hydraulic pressure is applied to the bottom of shaft 42 to balance its weight and that of the parts connected to it, so that the thrusts of gears 44 and 50 are equal and transmit equal loads to worm 30 located midway between gears 46 and 52.

The cutter assemblies are mounted on angular slides 60 and 62, angularly adjustable about worm shaft 31

(to accommodate workpieces or cutters of different diameters) in carriage 64 itself mounted for linear feed movement (under power of motor 63 through screw 65, FIG. 4) on posts 66 and 68 parallel to work axis 16.

Figure 8:
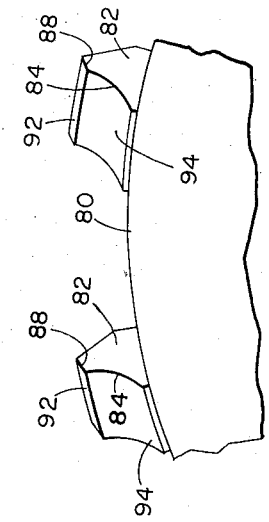
FIG. 8 is an axial view of a fragment of a cutter.

Each cutter (FIGS. 6, 8) has a body 80, 80' and cutting teeth or blades 82, 82' projecting radially outwardly therefrom. Each cutter has identical teeth inclined to the peripheral direction of cutter motion to match the direction of the tooth spaces of the workpiece, and arranged in a circle about the cutter axis, so as to be identically located both radially of and along the cutter axis. Each cutting tooth has a finishing edge consisting of a concavely curved portion 84 adapted to cut the entire working depth of the sides of the workpiece teeth 86, and an outside portion 88 to cut the workpiece teeth bottoms 90. The outside end 92 of each cutter tooth extends along a helix from front to rear, at a constant distance from the cutter axis. In addition, side surface 94 that contains the finish cutting edge portion 84 is helical, coaxial with the cutter, and of constant lead. As a result, when the cutting teeth are sharpened back the distance of the cutting edge from the cutter axis is preserved, and the original position of the cutting edge can be restored by resetting the cutter axially. Cutters of this type are described in U.S. Pat. Nos. 3,689,966 and 3,693,225, the disclosures of which are hereby incorporated by reference.

Advantageously, cutter relief (to keep the rear portions of the cutting teeth free of the workpiece during cutting) is provided by modified axial cutter positions. Thus, cutter 22 has its cutting edges offset rearwardly with respect to a plane containing the workpiece axis and perpendicular to axis 26, and cutter 24 has its cutting edges offset forwardly with respect to a corresponding plane containing the workpiece axis and perpendicular to axis 28. Accordingly, the axial distances of the respective cutters from their corresponding wormgears 32, 34 differ. Those axial distances are adjustable by replacement of spacer discs 100 between the cutter heads and spindles. To keep the range of axial adjustment down, the two cutter spindles are of different length between the spacer disc seat and the respective wormgear.

The cutters are arranged so that they respectively finish the opposite sides of each workpiece tooth, and so that the finish cuts of one cutter in a given toothspace overlap the finish cuts of the other cutter at the tooth bottom, each cutter thereby cutting clearance for the other with its finishing edges. Accordingly, there is no need for relief or sharpening at the side of the cutter tooth opposite the finishing edge.

Figure 7:
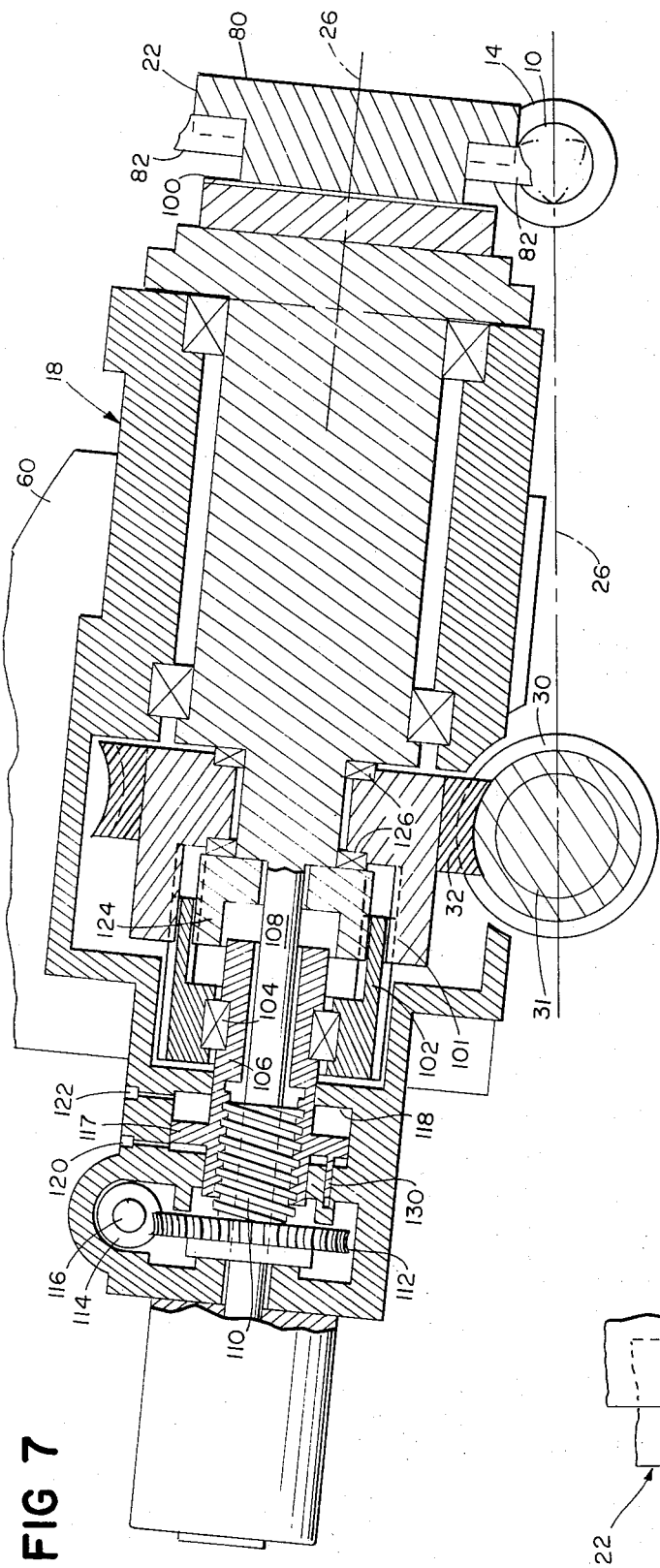
FIG. 7 is an enlarged axial section of a cutter assembly.
Figure 6:
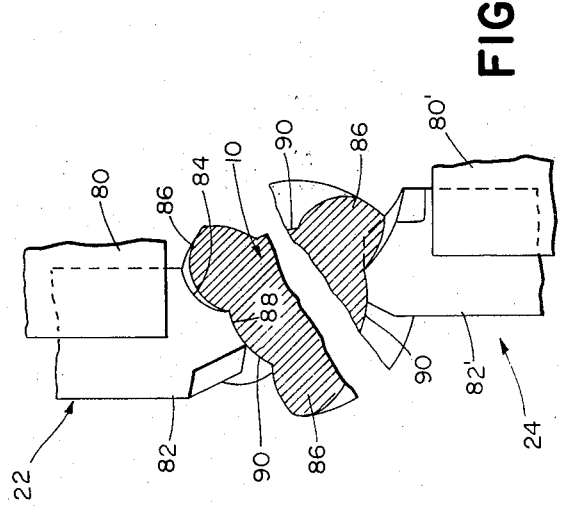
FIG. 6 is an enlargement of a fragment of FIG. 5.

The details of a typical cutter assembly are shown in FIG. 7. Wormgear 32 is rigidly connected to internal helical spline 101 which coacts with external helical spline 102 in turn mounted on bearings 104 axially fixed to sleeve 106 surrounding cutter drive spindle 108. Coaxial with, and threaded inside the end of, sleeve 106 is further sleeve 110 which carries wormgear 112. Worm 114 is keyed to shaft 116 and meshes with wormgear 112, so that the latter can be rotated by turning the worm (e.g., manually). Sleeve 106 has a piston portion 117 in pressure chamber 118, into which chamber are provided hydraulic fluid passages 120, 122 on opposite sides of the piston. External helical spline 102 also acts as an internal straight spline, coacting with external straight spline 124 rigidly connected to spindle 108. Bearings 126 permit relative rotation between the spindle and spline 101.

The cutter assembly mechanism just described permits adjustment of the phase relationship between the two cutters by enabling rotation of worm 30 while one of the cutter heads is stationary. For setting the initial phase relationship, worm 114 is turned, rotating wormgear 112 and turning sleeve 110 within sleeve 106 (which is prevented from rotating by pin 130 extending between piston 117 and the spindle housing), thus axially advancing or retracting sleeve 106 (depending upon the direction of adjustment). In turn spline 102 is shifted axially and, by reason of its helical mating with spline 101 and its straight mating with spline 124, produces a relative turning between the cutter and wormgear 32. Once the initial phase relationship has been set, the phase may be changed by a preset amount by introducing pressurized fluid into one of ports 120, 122 to cause piston 117 (and hence sleeve 106) to shift axially in chamber 118.

In overall operation, roughing preferably takes place during feed in one direction, and finishing takes place during the return feed. Between the roughing and finishing feeds piston 116 is shifted in chamber 118, to cause the cutters to remove some additional stock on the return feed. In addition, to cause some additional stock removal from the tooth bottoms 90 on the finishing pass, slides 60, 62 are advantageously pivoted after the roughing feed to cause the cutters to slightly approach the workpiece. Hydraulic means 140 for doing so are shown schematically in FIG. 5. On coarse pitches separate roughing and finishing operations may be used, if desired, simplifying the machine.

In both the roughing and finishing passes the cutter rotation is modified by the feed of carriage 64 along the workpiece axis, in proportion to the helix angle of the piece being cut. In the simplest case described thus far, the pitch radius of the cutter wormgears 32 and 34 equals the effective cutter pitch radius, the latter understood to be the radius of the cutter circle that rolls without sliding on a pitch line of the workpiece upon the axial feed along the workpiece axis. Thus, the workpiece and the worm 30, on the one hand, and the cutters on the other, undergo the same axial feed relative to each other.

Figure 9:
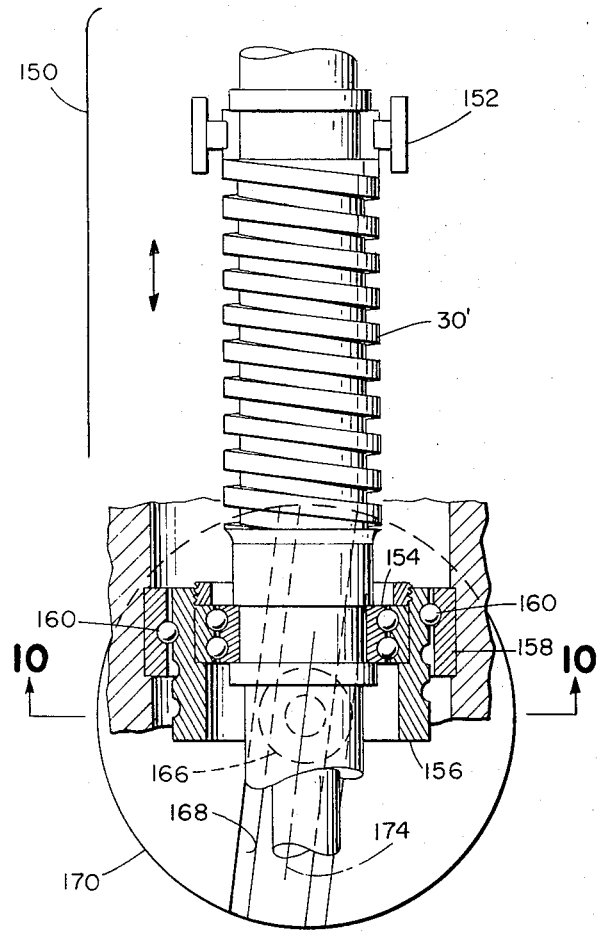
FIG. 9 is a plan view partially sectioned of the worm slide of another embodiment.
Figure 10:
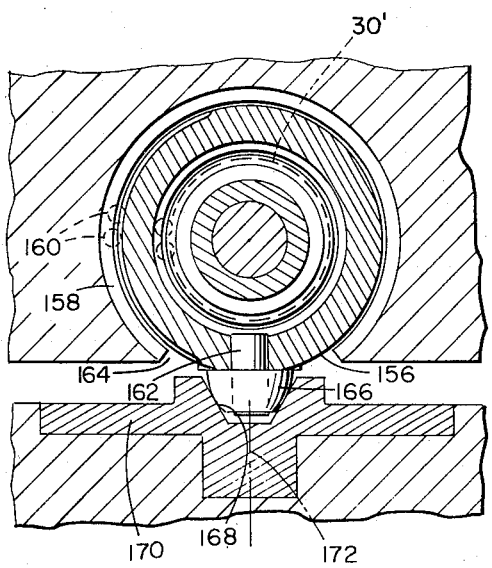
FIG. 10 is a sectional view taken along 10—10 of FIG. 9.

Provision can be made to introduce relative motion axially of the workpiece between the workpiece and worm 30 to make small helix angle changes. Thus, FIGS. 9 and 10 illustrate somewhat schematically an arrangement in which the workpiece and the cutter-driving worm 30' are mounted on a common slide 150 which (rather than the cutters) is driven to accomplish the feed motion axially of the workpiece. The worm is mounted at one end on a cylindrical roller bearing 152 carried by the slide, permitting some axial displacement between the inner and outer bearing races and hence axial displacement of the worm relative to the slide. The other end of the worm is mounted in a bearing 154 capable of taking axial thrust in both directions.

The outer race of bearing 154 is secured to a sleeve 156 that is helically movable in a further sleeve 158 carried in the slide. Balls 160 are provided between the sleeves to reduce friction. Sleeve 156 has a tongue 162 which extends through a circumferential slot 164 in sleeve 158 and through the bottom of slide 150, and carries a roller 166 having an axis of rotation radial of worm 30'. Roller 166 has an involute profile which engages opposite sides of a rack toothspace 168 in insert 170 in the machine frame. Insert 170 is moderately adjustable about axis 172, so that the centerline 174 of toothspace 168 can be set at a desired angle to the direction of slide movement. Thus, axial feed of the slide causes relative rotation of the sleeves, and hence axial movement of the worm along the slide.

Other embodiments are within the following claims.

I claim:

1. Apparatus for cutting teeth on a workpiece, comprising
   a workpiece support rotatable about a work axis;
   a pair of cutters respectively rotatable about cutter axes;
   each said cutter having cutting edges arranged to make successive finish cuts each extending across the entire working depth of a tooth, said edges of each cutter having identical radial and axial positions relative to their respective cutter axes,
   said cutter axes defining a plane transverse to said work axes, said cutter axes lying on opposite sides of said work axes and defining therebetween an acute angle,
   one cutter having its cutting edges offset forward, with respect to its cutter axis, of a plane transverse to that cutter axis and including said work axis;
   the other cutter having its cutting edges offset rearward, with respect to its cutter axis, of a plane transverse to that cutter axis and including said work axis;
   said cutters being arranged to respectively cut the opposite surfaces of each tooth, with said cutting edges cutting clearance for each other; and
   drive means for rotating said cutters and said workpiece in timed relation to each other and effecting relative feed motion between said cutters and said workpiece axially of said workpiece.

2. The apparatus of claim 1 wherein each said cutter has cutting teeth the outside ends of which extend along a cylindrical surface, each said cutting tooth has a cutting face inclined to the perpheral cutter direction and defining a said cutting edge, and means are provided for changing the axial position of a cutter after resharpening of its cutting edges.

3. The apparatus of claim 1 wherein each said cutter is mounted to permit its angular adjustment in the plane of said cutter axes, to permit change of said acute angle in accordance with workpiece diameter.

4. The apparatus of claim 1 wherein said plane of said cutter axes is perpendicular to said work axis and said cutting edges are curved.

5. The apparatus of claim 1 further comprising means for reversing the direction of said relative feed, and means for changing the relative phasing of said cutters to remove additional stock from said tooth surfaces during the reverse feed.

6. The apparatus of claim 5 wherein said cutters are adapted to cut the lobes of a rotor, said cutting edges each including a first portion for cutting the sides of said lobes and a second portion for cutting the toothspace bottoms between said lobes, and means are provided for causing said cutters to approach said workpiece prior to reversal of the direction of said feed.

7. The apparatus of claim 5 wherein said means comprises a hydraulically operated member movable between stops.

8. The apparatus of claim 7 further comprising means for initially adjusting said relative phasing to determine tooth thickness.

9. The apparatus of claim 1 wherein said drive means comprises
   a worm having an axis parallel to said work axis,
   a pair of equal wormgears respectively rigid with said cutters and in mesh with said worm,
   gears for timing the rotation of said workpiece to the rotation of said worm, and
   means for producing relative motion, axially of said workpiece, between said workpiece and said worm on one hand and said cutters on the other hand.

10. The apparatus of claim 9 further comprising means for producing relative motion axially of said workpiece between said worm and said workpiece.

11. The apparatus of claim 1 wherein said workpiece support includes drive portions respectively above and below said workpiece.

12. The apparatus of claim 11 wherein said drive means includes an axially floating shaft parallel to said work axis for transmitting equal torque to said spindle portions.

* * * * *